No. 682,899. Patented Sept. 17, 1901.
H. T. D'ARNOULT.
ACCUMULATOR PLATE.
(Application filed Apr. 1, 1901.)
(No Model.)
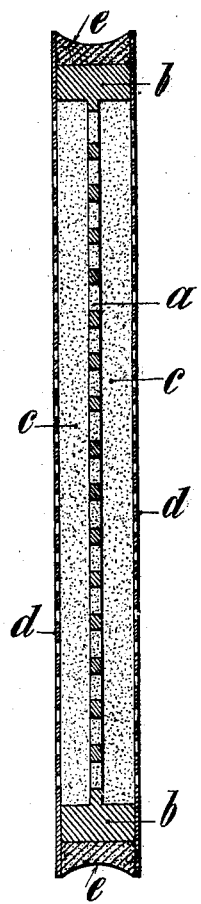
WITNESSES:
INVENTOR
Henry Tevier D'Arnoult
BY
Philip Mauro
ATTORNEY
THE NORRIS PETERS CO., PHOTO-LITHO., WASHINGTON, D. C.

UNITED STATES PATENT OFFICE.

HENRY TEXIER D'ARNOULT, OF PARIS, FRANCE.

ACCUMULATOR-PLATE.

SPECIFICATION forming part of Letters Patent No. 682,899, dated September 17, 1901.

Application filed April 1, 1901. Serial No. 53,856. (No model.)

*To all whom it may concern:*

Be it known that I, HENRY TEXIER D'ARNOULT, a citizen of the Republic of France, residing at Paris, France, have invented certain new and useful Improvements in or Relating to Accumulator-Plates, (for which application has been made in France, March 8, 1901,) of which the following is a specification.

This invention relates to accumulator-plates having as their base a mixture of oxid of lead and alkaline sulfates—such as ammonium, magnesium, sodium, and the like; and it consists, essentially, in insulating the grid-frame and the perforated plate or grid which it incloses by a layer of celluloid, while inclosing side plates of celluloid are attached to the frame by the layers of celluloid. The advantages of plates constructed in accordance with this invention are greater solidity and also the greatest decrease in weight that can be attained.

The exciting-paste is prepared in the following manner: Oxid of lead is slightly moistened with a solution of an alkaline sulfate, as of ammonium, magnesium, sodium, &c., which is preferably sprinkled over the oxid of lead. It is very necessary to have the paste damp, so that the powder will agglomerate. The paste prepared in this manner is coated upon an ordinary perforated plate or grid comprising the core of the electrode. After it has been spread over equally and the superfluous paste removed two celluloid plates slightly larger than the perforated plate are placed in position, so as to form along the edges of the grid a channel or gutter. Into these channels is placed powdered celluloid upon which a few drops of acetone are poured. This is then pressed in some suitable manner until set or dry. The celluloid dissolved by the acetone when hardened forms a joint between the two inclosing plates and the grid itself and effectually seals the accumulator. The insulating of the plate, as well as the inclosing plates of celluloid, effects the preservation of the exciting-paste. By this method of preparation all around the grid is obtained a substantial thickness of pasty celluloid, produced by the action of a few drops of acetone. This seal of celluloid in hardening forms a very resistant block and there is no fear of the celluloid plates cracking or breaking off when they are bent.

In the accompanying drawing, $a$ represents the grid with its frame $b$. The exciting-paste or active matter is shown at $c$, held in place between two celluloid plates $d$, forming channels $e$ along the edges, into which is introduced the powdered celluloid and acetone, as described, so as to insulate the frame $b$.

The following are some of the advantages attendant on the above method of preparation of the celluloid paste:

First, as the active substance is not in a pasty condition when putting the cell together the holes in the celluloid plates will not be choked up. The electrolyte will thus be able to penetrate freely through the exciting substances, the resistance of the cell will be decreased, and the area subject to the action of the electrolyte will be increased.

Second, by mixing the active matter with alkaline salts, which eventually dissolve, the porosity is increased and the risk of any harm resulting from the expansion of the substance is diminished, as it is well known that under the action of the current the substance expands and is apt distort or break or detach the casing containing it. Besides, the reciprocal action has the effect of causing part of the active substance to pass through the holes in the celluloid plates, and this in falling might cause a short-circuit, as well as diminishing the amount of active substance held against the plate.

What I claim as my invention, and desire to secure by Letters Patent, is—

1. An accumulator-plate comprising a grid, active material on the grid, perforated celluloid plates between which the grid and active material are located, the edges of said plates projecting beyond and forming therebetween a recess or channel around the outer edges of the grid and active material, and a filling of insulating-cement in said channel.

2. An accumulator-plate comprising a grid, a frame about the grid, active material on the grid within the frame, two perforated celluloid plates between which the grid-frame and active material are located, the edges of said plates projecting beyond and forming therebetween a recess or channel around the outer edge of the frame, and a filling of insulating-cement in said channel.

3. An accumulator-plate comprising a grid, a frame about the grid, active material on opposite sides of the grid within the frame, two perforated celluloid plates between which the grid-frame and active material are located, the edges of said plates projecting beyond and forming therebetween a recess or channel around the outer edge of the frame, and a filling of celluloid cement in said channel.

In testimony whereof I have signed this specification in the presence of two subscribing witnesses.

HENRY TEXIER D'ARNOULT.

Witnesses:
  EMILE LEDRET,
  EDWARD P. MACLEAN.